United States Patent [19]
Glass, III et al.

[11] Patent Number: 6,046,986
[45] Date of Patent: *Apr. 4, 2000

[54] ISDN TERMINAL EQUIPMENT-RESIDENT MECHANISM FOR DETERMINING SERVICE PROFILE IDENTIFIERS AND ASSOCIATED TELECOMMUNICATION SWITCH PROTOCOL

[75] Inventors: James M. Glass, III; Paul G. McElroy; Michael T. Lattanzi, all of Huntsville; Charles R. Rehage, Ardmore, all of Ala.

[73] Assignee: Adtran, Inc., Huntsville, Ala.

[*] Notice: This patent is subject to a terminal disclaimer.

[21] Appl. No.: 08/923,237

[22] Filed: Sep. 4, 1997

Related U.S. Application Data

[63] Continuation of application No. 08/648,519, May 13, 1996, Pat. No. 5,715,241.

[51] Int. Cl.⁷ ........................................ H04J 3/12
[52] U.S. Cl. ...................... 370/252; 370/904; 379/246
[58] Field of Search .................... 370/252, 254, 370/255, 466, 476, 522, 524; 379/245, 246

[56] References Cited

U.S. PATENT DOCUMENTS

| | | | |
|---|---|---|---|
| 4,959,856 | 9/1990 | Bischoff et al. | 379/245 |
| 5,012,466 | 4/1991 | Buhrke et al. | 370/270 |
| 5,329,318 | 7/1994 | Keith | 348/699 |
| 5,386,466 | 1/1995 | Bales et al. | 379/220 |
| 5,621,731 | 4/1997 | Dale et al. | 370/79 |
| 5,708,778 | 1/1998 | Monot | 395/200.1 |
| 5,715,241 | 2/1998 | Glass, III et al. | 370/252 |
| 5,748,628 | 5/1998 | Ericson et al. | 370/384 |
| 5,751,802 | 5/1998 | Carr et al. | 379/201 |
| 5,761,293 | 6/1998 | Newlin et al. | 379/230 |
| 5,793,307 | 8/1998 | Perreault et al. | 340/825.5 |
| 5,793,751 | 8/1998 | Baker et al. | 370/250 |
| 5,864,559 | 1/1999 | Jou et al. | 370/465 |
| 5,867,569 | 2/1999 | Martinez et al. | 379/207 |
| 5,867,789 | 2/1999 | Olds et al. | 455/453 |
| 5,883,883 | 3/1999 | Baker et al. | 370/250 |
| 5,916,304 | 6/1999 | Ericson et al. | 709/222 |

FOREIGN PATENT DOCUMENTS

WO 95/22218  8/1995  WIPO .

*Primary Examiner*—Min Jung
*Attorney, Agent, or Firm*—Charles E. Wands

[57] ABSTRACT

The inability of an ISDN equipment user to properly configure ISDN terminal equipment, even when provided with correctly assigned switch protocol, SPID and LDN parameters by a telephone service provider, is successfully remedied by a SPID/switch protocol detector. Upon being invoked by the user, the routine proceeds to conduct an iterative search of stored SPID formats associated with different central office switch protocols. SPIDs are assembled in accordance with the iteratively accessed SPID formats and directory number information that has been entered by the user. If an attempt to register a SPID is successful, the routine places a test call. If the test call is successful, the SPID and its associated switch protocol will have been identified, and the terminal equipment may place a call.

23 Claims, 5 Drawing Sheets

SPID FORMAT TABLE - AT&T 5ESS SWITCH

| PREFIX | SUFFIX | SPID FORMAT |
|---|---|---|
| NONE | NONE | NO SPIDs |
| 01 | 0 | 01 + 7 DIGITS + 0 |
| END OF TABLE | | |

NONE INDICATES NO PREFIX OR SUFFIX

FIG. 6

SPID FORMAT TABLE - NATIONAL ISDN/DMS-100 CUSTOM SWITCH

| PREFIX | SUFFIX | SPID FORMAT |
|---|---|---|
| NATIONAL ISDN | | |
| AC | 0101 | AREA CODE + 7 DIGITS + 0101 |
| AC | 0100 | AREA CODE + 7 DIGITS + 0100 |
| AC | 000 | AREA CODE + 7 DIGITS + 000 |
| AC | 0 | AREA CODE + 7 DIGITS + 0 |
| AC | 00 | AREA CODE + 7 DIGITS + 00 |
| AC | 100 | AREA CODE + 7 DIGITS + 100 |
| AC | 0000 | AREA CODE + 7 DIGITS + 0000 |
| AC | 0011 | AREA CODE + 7 DIGITS + 0011 |
| AC | 0111 | AREA CODE + 7 DIGITS + 0111 |
| 01 | 0 | 01 + 7 DIGITS + 0 |
| 01 | 000 | 01 + 7 DIGITS + 000 |
| 01 | 001 | 01 + 7 DIGITS + 001 |
| 01 | 011 | 01 + 7 DIGITS + 011 |
| DMS-100 CUSTOM | | |
| NONE | NONE | 7 DIGITS |
| AC | NONE | AREA CODE + 7 DIGITS |
| AC | LDN[6]LDN[7] | AREA CODE + 7 DIGITS + LDN[6]LDN[7] |
| AC | LDN[7] | AREA CODE + 7 DIGITS + LDN[7] |
| AC | 01 | AREA CODE + 7 DIGITS + 01 |
| AC | 11 | AREA CODE + 7 DIGITS + 11 |
| AC | 0001 | AREA CODE + 7 DIGITS + 0001 |
| AC | 0111<br>0211 | AREA CODE + 7 DIGITS + 0111<br>AREA CODE + 7 DIGITS + 0211 |
| AC | 1<br>2 | AREA CODE + 7 DIGITS + 1<br>AREA CODE + 7 DIGITS + 2 |
| NONE | 00 | 7 DIGITS + 00 |
| END OF TABLE | | |

NONE INDICATES NO PREFIX OR SUFFIX
AC REPRESENTS THE 3 DIGIT AREA CODE
LDN[n] IS THE nth DIGIT OF THE LOCAL DIRECTORY NUMBER

ISDN TERMINAL EQUIPMENT-RESIDENT MECHANISM FOR DETERMINING SERVICE PROFILE IDENTIFIERS AND ASSOCIATED TELECOMMUNICATION SWITCH PROTOCOL

This is a continuation of application Ser. No. 08/648,519, filed May 13, 1996, now U.S. Pat. No. 5,715,241.

FIELD OF THE INVENTION

The present invention relates in general to communication systems, and is particularly directed to a link pre-establishment control mechanism incorporated into the control software employed by the microcontroller of integrated services digital network (ISDN) terminal equipment, for determining the service profile identifier (SPID) of the telecommunications switch installed by the local service provider to couple the customer's equipment with the network, so that the terminal equipment may gain connectivity (place a call) through the switch and over the network to a destination site.

BACKGROUND OF THE INVENTION

Integrated services digital network (ISDN) communications enable telephone service providers to supply multiple types of signalling channels from a central office over a single twisted pair-configured, local loop to a network termination interface or ISDN terminal equipment, such as, but not limited to an ISDN phone, an X.25 packet device, or an ISDN terminal adapter, to which customer premises-resident data terminal equipment may be coupled.

These multiple types of signalling channels typically include a digital data channel, a digitized voice channel and a separate dialing channel. Since the ISDN terminal equipment is customer-installed, the local telephone service provider does not participate in the customer's choice of equipment to be connected to the ISDN line.

However, in order for a customer to actually place a call through an installed piece of terminal equipment, it is necessary that the terminal equipment's supervisory communications controller be properly initialized or preconfigured with a prescribed set of communication parameters. These parameters include the telecommunications switch protocol employed in the local service provider's central office facility, the local directory numbers (LDNs), including area codes, associated with the two ISDN bearer (B1, B2) channels, and a service profile identifier or SPID. The SPID is a sequence of digits, which identifies the ISDN terminal equipment that is coupled to the ISDN switch, and is assigned by the local telephone service provider, when the ISDN line is installed. The number of SPIDs required (0, 1 or 2) will depend upon how the ISDN line is configured.

Now although the switch protocol and SPID parameters are routinely supplied by the telephone service provider to the purchaser of the ISDN terminal equipment equipment, the user is usually technically unsophisticated and accustomed to doing nothing more than simply installing an analog modem in the customer's premises-located equipment, and plugging in a telephone connector to a modem port (RJ 11 jack). Indeed, experience has shown that on the order of eighty percent of ISDN customers will burden the equipment supplier and/or the local telephone service provider with requests for technical support in the course of configuring the settings for ISDN terminal equipment, irrespective of whether the service provider has correctly assigned each of the switch protocol, SPID and LDN parameters for use by the customer's ISDN terminal equipment.

SUMMARY OF THE INVENTION

In accordance with the present invention, the user's (actual or perceived) inability to properly configure ISDN terminal equipment, even when provided with correctly assigned switch protocol, SPID and LDN parameters by the telephone service provider, which places a labor-intensive service burden on the equipment supplier and/or the local phone company, is successfully remedied by a SPID/switch detector mechanism that is incorporated into the terminal equipment's communications control software. The only customer participation required is that of inputting the local directory numbers, and invoking the SPID/switch detection mechanism via a user interface.

Upon being invoked, the SPID generator mechanism proceeds to step through a prescribed SPID table search and generation routine, followed by a test call communication exchange with the telecommunications switch employed by the local service provider to couple the customer's equipment with the network. During this process, the control mechanism iteratively attempts to register respectively different service profile identifiers (SPIDs), as necessary, until the correct SPID and corresponding switch protocol is identified.

As will be described, the SPID/switch protocol detection mechanism is an exclusionary process, which attempts to bring up the line or register a SPID in an iterative or stepwise manner, proceeding through respective SPID format loops associated with separate tables or list entries for respectively different switch protocols that may be employed by the local service provider. For the above-referenced examples of switch protocols currently employed by telephone service providers, the present invention accesses two respectively different SPID tables, one of which contains entries for an AT&T switch protocol (AT&T Custom), and the other of which contains two successive sets of entries—one for a National ISDN switch protocol (e.g., NI-1 or NI-2) and the other for a DMS switch protocol (Northern Telecom DMS-100 Custom). At the start of the iterative search, the routine sets the SPID format index to zero, sets the switch protocol to National ISDN, and resets the link.

The SPID format routine then looks for a specific switch protocol—AT&T Custom (which also has a reduced number of table entries, allowing an expedited SPID format search). If the switch protocol is AT&T Custom, the subroutine accesses the AT&T SPID format table. If not, the SPID format subroutine accesses the table containing listings for National and DMS-100 SPID formats.

Once a SPID format table has been selected, suffix and prefix codes are generated, as necessary. (If there is no prefix and no suffix code and AT&T protocol had been selected, a point-to-point connection (involving no SPID) is inferred.) The prefix code is examined to determine whether it indicates an area code entered by the user. If so, the three digit area code entered by the user is employed as the SPID prefix. If there is no three digit prefix code, the prefix code is examined to determine whether it is the two digit prefix code 01. If so, the two digit code '01' is used as the SPID prefix. If neither of these prefixes is found, no prefix code is used. Once the prefix code has been determined, a zero to four digit suffix code is generated from whichever SPID format table was selected.

Given both prefix and suffix codes (plus the local directory number(s) entered by the user, one or two SPIDs are respectively defined as the combination of the prefix code, the first/second local directory number (LDN) entered by the user and the suffix code. If the terminal equipment has only one phone number, the second (non-existent phone number-associated) SPID is designated as 'none'.

With the SPID or SPIDs determined, an attempt is made to bring up the line (registering the SPID(s)). If the attempt is successful, it is inferred that the SPID(s) and associated switch protocol are correct and a test call sequence is invoked. However, if the attempt to bring up the line using the derived SPID(s) is unsuccessful, the process executes sequence of operations to determine the reason for the failure.

For this purpose, during the initial attempt to select and register the proper National ISDN SPID format, the routine checks for characteristic behavior of AT&T switches, namely, the receipt of any Management Information Message (MIM), or receipt of a call set-up message containing an invalid reference number. As such responses are unique to AT&T switches, if received, it is inferred that the switch is an AT&T switch and the process selects AT&T custom protocol and resets the SPID format index to zero. It then transitions to a SPID table exhaustive search subroutine. However, if no 'AT&T' responses have been received, it is inferred that the switch is not an AT&T switch and the process does not change the initially selected National ISDN switch protocol and SPID format index.

During the course of the SPID format search, the table of SPID format indices is stepped or advanced, one index entry at a time, to the next SPID index, until all of the table entries have been tried. If no table entry has been able to produce the required SPID, a failure to generate a SPID is inferred and the routine is terminated. With each one or two new SPIDs generated from the next table entry, the routine attempts to bring up the line (register the generated SPID (s)). If any attempt to bring up the line is successful, it is inferred that the derived SPID and switch protocol for that attempt are correct, and the process then branches to a test call subroutine.

In the test call routine, if only one LDN has been entered by the user, the routine attempts to call that number. If two phone numbers have been entered, the first entered number is used as the 'calling' number and the second number is employed as the 'called' number. The terminal equipment places a test call to the called number. To distinguish between National ISDN and DMS-100 protocol, the test call contains a low layer compatibility information element, which is specified under National ISDN, but not under DMS custom. The routine also monitors test call progress for receipt of a prescribed status message associated with the behavior of DMS Custom switch protocol.

Once the call is placed, a time-out is invoked. If the call is received from the switch within a prescribed period of time (e.g., within 30 seconds), it is inferred that the determined SPID/switch protocol is correct. However, if the switch returns a failure indication or the time-out expires before the call is received from the switch, the called number is modified by adding a prefix "9" to the LDN, and the call is redialed. Again, the redialed call must be received from the switch within the prescribed time-out period. If so, it is inferred that the determined SPID/switch protocol is correct. If not, the test call fails and the process is terminated.

Once a test call (or redialed test call) has been successfully placed, a determination is made as to whether the selected protocol is AT&T Custom switch protocol, a National ISDN switch protocol or a DMS-100 switch protocol. If the selected protocol is not AT&T Custom, an inquiry is made as to whether the test call returned a status message containing the Cause IE equal to 43 (ACCESS INFO DISCARDED), which is characteristic of DMS custom switch protocol. Since the test call contains a low layer compatiblity information element, specified under National ISDN, but not under DMS custom, the test call progress can be monitored for a prescribed status message associated with the behavior of DMS Custom switch protocol. If the iterative SPID search has advanced beyond the last National ISDN entry, DMS behavior is inferred. If DMS behavior is not detected, it is concluded that the SPID is associated with National ISDN switch protocol.

BRIEF DESCRIPTION OF THE DRAWINGS

FIG. 6 is a table of SPID formats associated with an AT&T Custom switch protocol; and FIG. 7 is a table of SPID formats associated with National ISDN and DMS-100 Custom switch protocols.

DETAILED DESCRIPTION

Figure 1:
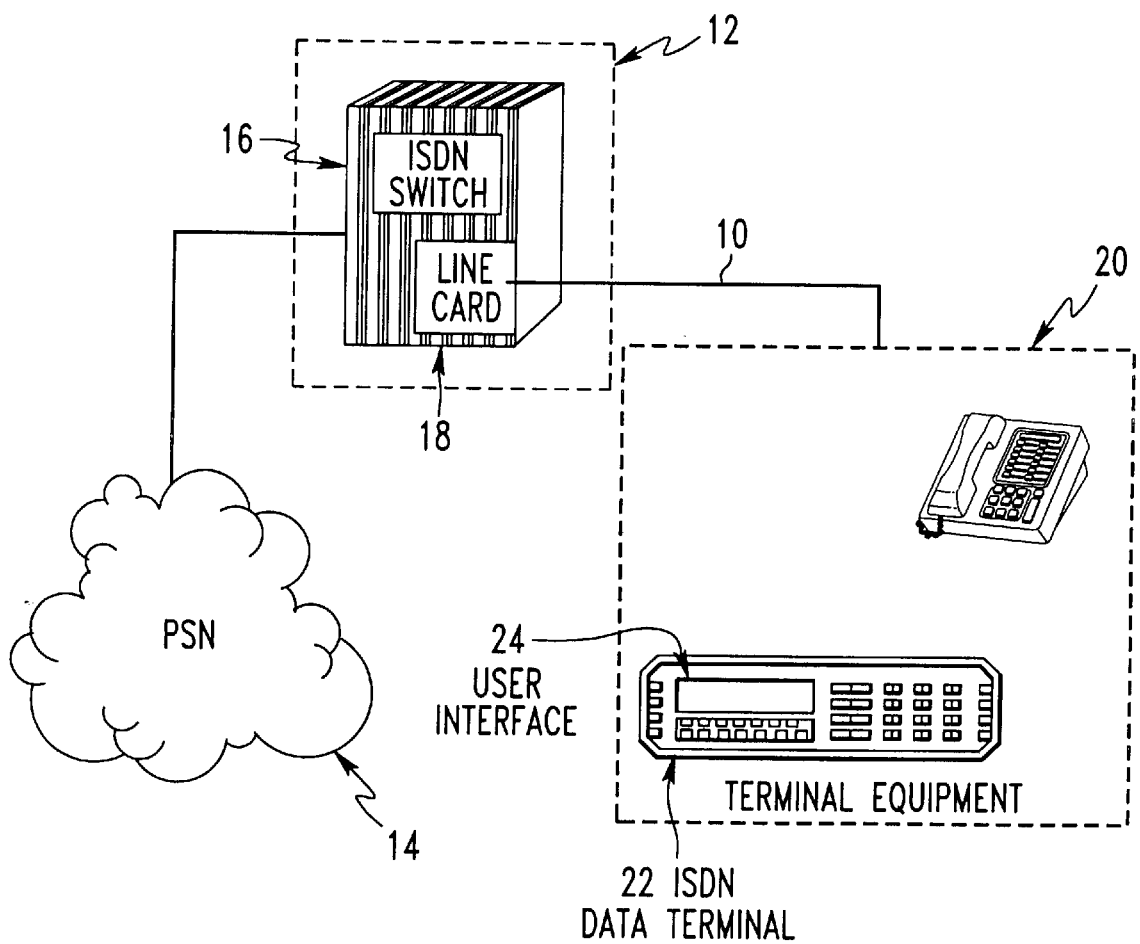
FIG. 1 diagrammatically illustrates a reduced complexity example of a typical integrated services digital network, having a local loop directly coupled from a telco central office, through which access to a public service network is effected.

Before describing in detail the new and improved SPID/switch protocol detector mechanism in accordance with the present invention, it should be observed that the invention resides primarily in what is effectively a prescribed precursor ISDN communication link pre-establishment control mechanism, that is embedded in the communications control software resident in ISDN terminal equipement. The particular data format and communications protocol employed by the switch to which the ISDN terminal equipment is linked is not considered part of the invention.

Consequently, the invention has been illustrated in the drawings in readily understandable block diagram and associated flow chart format, which show only those specific details that are pertinent to the present invention, so as not to obscure the disclosure with details which will be readily apparent to those skilled in the art having the benefit of the description herein. Thus, the block diagram and flow chart illustrations are primarily intended to illustrate the major components of the communication control mechanism in a convenient functional grouping, whereby the present invention may be more readily understood.

FIG. 1 diagrammatically illustrates a reduced complexity example of a typical integrated services digital network (ISDN), having a local loop (twisted tip/ring pair) 10 directly coupled from a central office 12 of a telephone service provider, through which access to a public switced telephone network (PSTN) 14 is provided. The central office 12 includes a central office switch 16, which contains a plurality of line termination circuits (or line cards), one of which is shown at 18. As non-limiting examples, the central office switch 12 may comprise any one of an AT&T 5ESS custom switch, a Northern Telecom DMS-100 custom switch, a Siemens EWSD switch (employing National ISDN protocol), or National ISDN firmware-customized versions of the 5ESS and DMS-100 switches. Each of these respectively different switch protocols has its own characteristic SPID formats, which are not necessarily the same as those of any of the other switch protocols.

In the network of FIG. 1, a respective line card 18 of the central office switch 16 is coupled over the local loop 10 to ISDN terminal equipment 20, through an internal or external network termination circuit, to which customer premises equipment is coupled, as shown at 22. ISDN terminal equipment 20 may comprise Express XRT terminal adatper, manufactured by Adtran Corp., Huntsville, Ala., as a non-limiting example. It should be observed, however, that the present invention is not limited to use with this or any other particular piece of ISDN terminal equipment, but is intended as an augmentation to the communication supervisory control mechanisms employed in ISDN terminal equipments supplied from a variety of manufacturers. To allow the customer to configure the ISDN terminal equipment 20 for use with a particular switch protocol, the terminal equipment 20 includes a user interface 24—for example, a set of front panel-mounted switches and an associated display, or a software-controlled computer interface, such as a terminal display screen menu, or AT commands, selections among which are invoked or supplied in a customary manner by the point and click operation of a mouse or keyboard-sourced inputs.

As mentioned above, of the configuration parameters required for successful terminal equipment operation, the telecommunications switch protocol employed by the central office 12, LDNs, and requisite service profile identifiers (SPIDs) for that switch protocol are usually supplied by the telephone service provider. However, being technically unsophisticated, the customer may have difficulty in setting up these configuration parameters and can be expected to call the ISDN equipment supplier and/or the local telephone service provider, with a request for assistance as to how to configure the settings of the terminal equipment.

In accordance with the invention, this problem is successfully addressed by augmenting the control software employed by the terminal equipment's supervisory communications controller to include an SPID/switch protocol detection mechanism. As will be described below, once invoked by the user, the SPID/switch protocol detector mechanism of the invention proceeds to step through a prescribed SPID table search and generation routine, followed by a test call communication exchange with the telecommunications switch employed by the local service provider to couple the customer's equipment with the network. During this process, the control mechanism iteratively attempts to register respectively different service profile identifiers (SPIDs), as necessary, until the correct SPID and corresponding switch protocol is identified.

The respective steps of the SPID/switch protocol detection mechanism of the present invention will now be described with reference to the flow charts of FIGS. 3–5. To facilitate correlation of the respective steps of the SPID detection process with the respective Figures, the prefix number for each step is the same as the number of the Figure whose flow chart contains that step.

Figure 2:
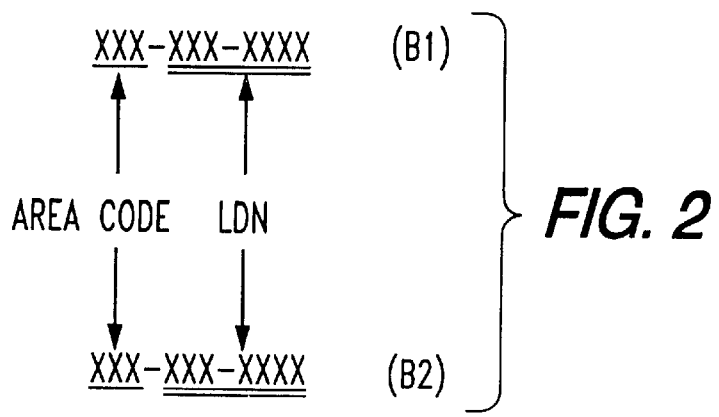
FIG. 2 shows the format of local directory numbers.
Figure 3:
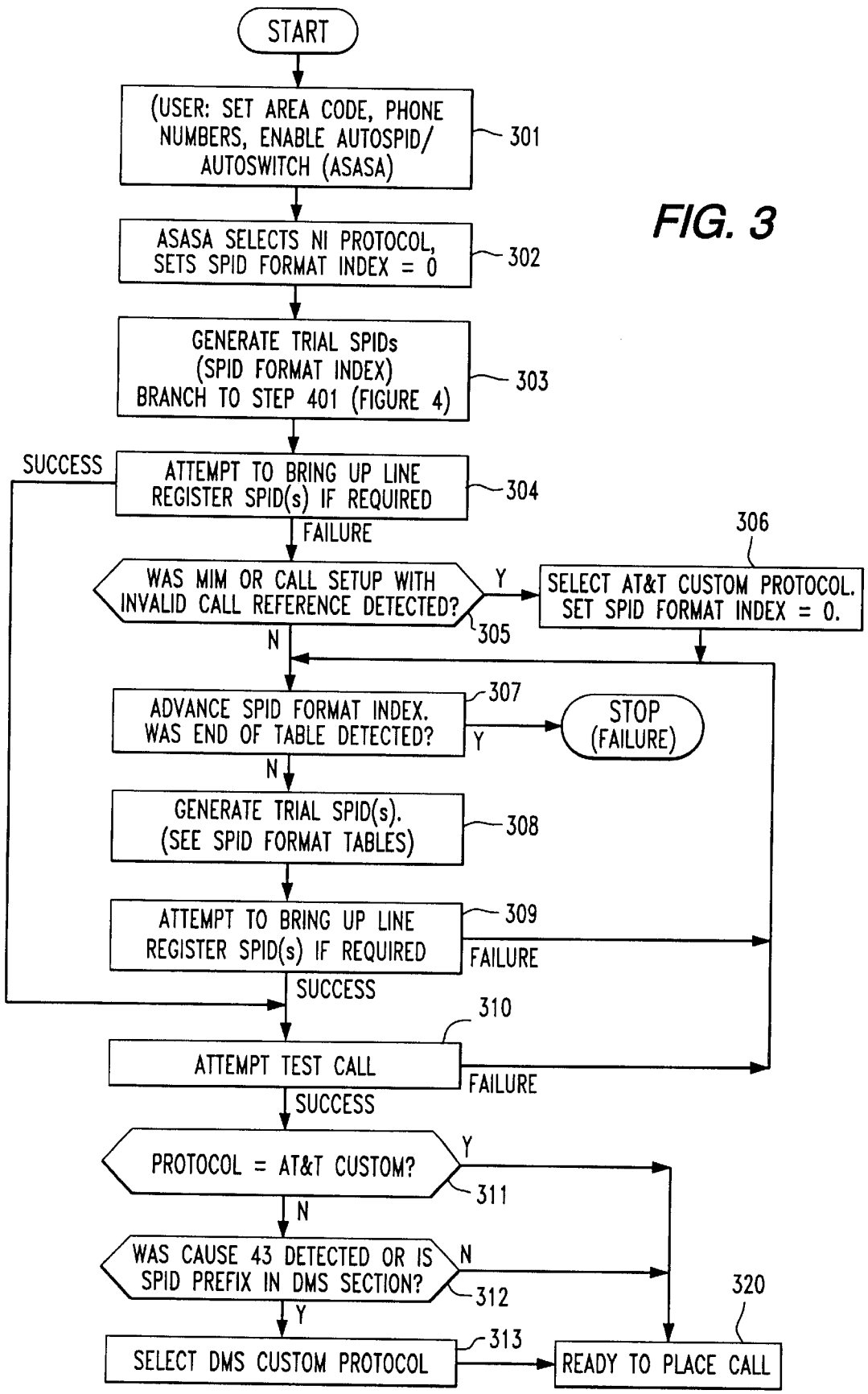
FIG. 3 shows respective steps of the link pre-establishment control mechanism executed by the SPID/switch protocol detector mechanism of the present invention.

Referring initially to the flow chart of the link pre-establishment routine of FIG. 3, the process starts at step 301, wherein a user prompt message is generated, instructing the user to enter one or two local directory numbers (LDNs) including area codes, having the format shown in FIG. 2, followed by a menu selection or entry of an AT command via the terminal equipment user interface 24 of FIG. 1.

As pointed out previously, this entry of local directory number information, as by way of a set of front panel switches, or other user interface, is the only information required to be supplied by the user for SPID/switch protocol in accordance with the present invention. Once the local directory number information (one or two LDNs) has been input by the user, and the user has initiated the iterative SPID/switch protocol search and detect routine to be described, the sequence transitions to step 302, which begins an iterative SPID search process.

More particularly, as described above, the SPID/switch protocol detection mechanism is an exclusionary process, which attempts to bring up the line or register a SPID in an iterative or stepwise manner, proceeding through respective SPID format loops associated with separate tables or list entries for respectively different switch protocols that may be employed by the local service provider. For the above-referenced examples of switch protocols currently employed by telephone service providers, the present invention accesses two respectively different SPID tables, the contents of which are listed in FIGS. 6 and 7, as will be described.

At the beginning of the process in step 302, the routine selects National ISDN protocol, as a non-limiting example, resets the SPID format index (sets the SPID format index to zero), which causes a loss of 2B1Q synchronization, resetting the link. With the SPID index currently reset (0) and the link reset, the routine transitions to step 303, which branches to the SPID format subroutine of FIG. 4.

Figure 4:
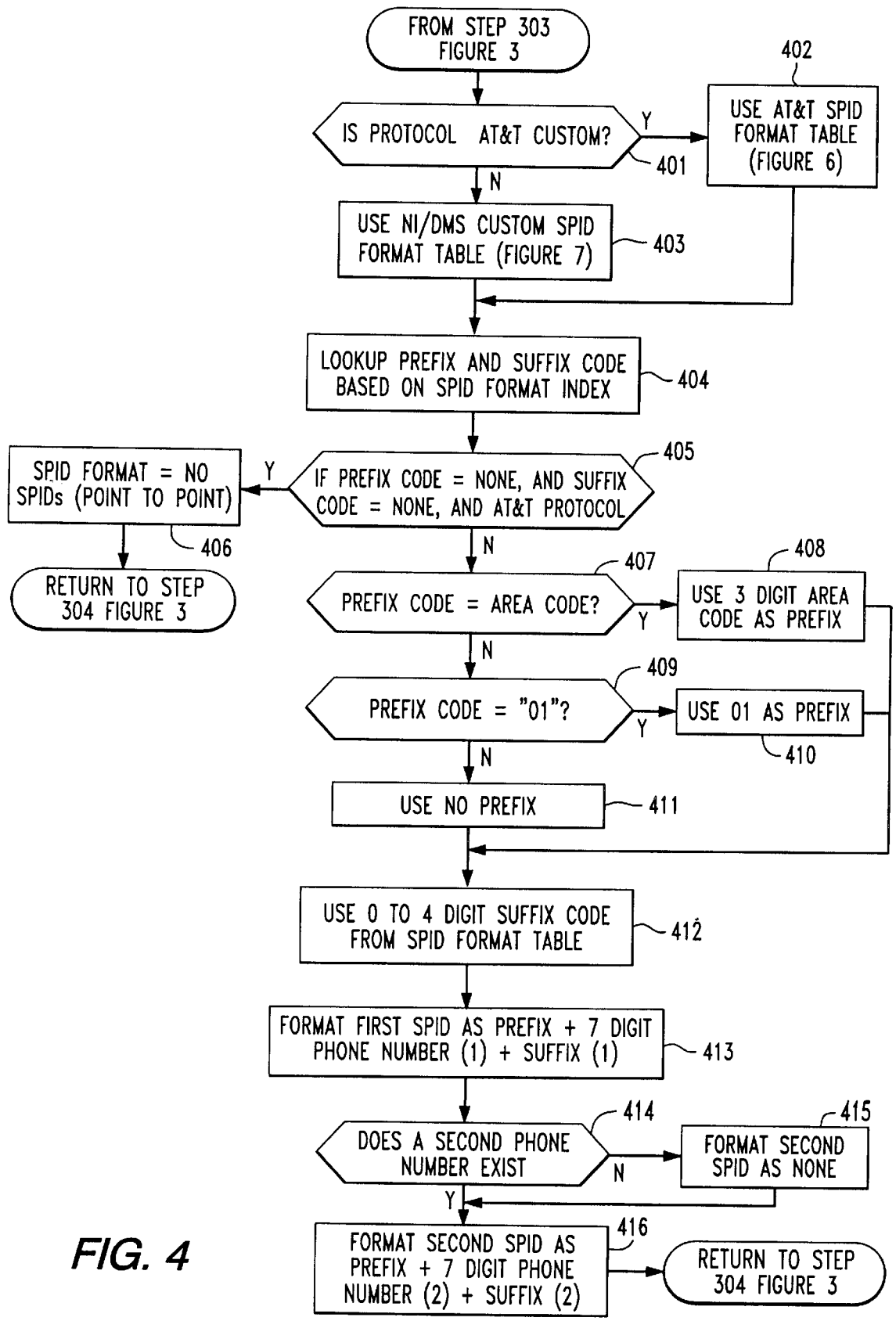
FIG. 4 shows the respective steps of a SPID format subroutine employed within the link pre-establishment control mechanism of FIG. 3.

As shown in FIG. 4, the SPID format routine begins with a query step 401 to determine whether the protocol is AT&T Custom (which has has a reduced number of table entries as shown in FIG. 6). If the answer to query step 401 is YES (the SPID protocol is AT&T Custom), the subroutine transitions to step 402, wherein the AT&T format table shown in FIG. 6 is accessed. On the other hand, if the answer to query step 401 is NO (the SPID protocol is not AT&T Custom), the subroutine transitions to step 403, wherein the sequential listings for National ISDN and DMS-100 formats of the table shown in FIG. 7 are accessed.

Once a SPID format table has been selected, the subroutine transitions to step 404, wherein the SPID format subroutine generates a suffix code and a prefix code, as necessary, from the accessed SPID format table. Next, in query step 405, the prefix and suffix codes are examined. If there is no prefix and no suffix code, and AT&T protocol has been selected (the answer to the query step 401 is YES), a point-to-point connection (involving no SPID) is inferred, and the process transitions to step 406, which generates a "NO SPIDs" indication, and exits the subroutine of FIG. 4 to the next step 304 of the routine of FIG. 3. On the other hand, if the connection is not a point-to-point connection via an AT&T switch, the answer to query step 405 will be NO, and the subroutine of FIG. 4 proceeds to determine the prefix code (PC), if applicable.

In particular, the SPID format subroutine transitions to query step 407, where the prefix code is examined to determine whether it indicates an area code. If the answer to query step 407 is YES, the subroutine transitions to step 408, which sets the three digit area code to the first three digits of the LDN (entered by the user) as the SPID prefix, and proceeds to step 412, wherein the SPID suffix code is derived. On the other hand, if the answer to query step 407 is NO (indicating no three digit prefix code), the subroutine transitions to step 409, wherein the prefix code is examined to determine whether it is the two digit prefix code '01'.

If the answer to query step 409 is YES, the subroutine transitions to step 410, which sets the two digit code '01' as the SPID prefix, and proceeds to step 412. If the answer to query step 409 is NO, however, the SPID format subroutine transitions to step 411, which indicates that no prefix is to be employed, and the subroutine proceeds to the suffix code generation step 412. In step 412 a zero to four digit suffix code is generated from whichever SPID format table was selected in SPID format table selection steps 402 or 403, described above.

Once the SPID's suffix code has been generated, the SPID format subroutine transitions to step 413, wherein a first SPID is generated. This first SPID is defined as the combination of the prefix code (as determined in one of the above step 408 or step 410), the last seven digits of the local directory number (LDN) entered by the user in step 301, and the suffix code generated in step 412. Once this first SPID has been generated, the subroutine transitions to query step 414, which examines the phone number information entered by the user, to determine whether the user had entered more than one phone number. If the answer to query step 414 is NO (the terminal equipment has only one phone number), the subroutine transitions to step 415, which formats the second (non-existent phone number-associated) SPID as 'none', and exits to step 304 of the main routine of FIG. 3.

On the other hand, if the answer to query step 414 is YES (the terminal equipment contains two phone number entries), the SPID format subroutine transitions to step 415, which formats the second SPID as the combination of the prefix code generated in either step 408 or step 410), the second LDN entered by the user in step 301, and the suffix code generated in step 412. (It may be noted that the DMS SPID formats include exceptions for the second LDN, which is not equal to the suffix for the first LDN, as shown in FIG. 7. Also, in table of FIG. 7, the area code is considered to be the first three digits, and the LDN is considered to be the last seven digits.) Once the second SPID has been generated, the subroutine of FIG. 4 exits to step 304 of the main routine of FIG. 3.

With a single SPID or two SPIDs having been determined in accordance with execution of the SPID format sub-routine of FIG. 4, described above, then in step 304 of the main routine of FIG. 3, an attempt is made to bring up the line (registering the SPID(s)). If the attempt is successful, it is inferred that the derived SPID(s) and associated switch protocol as determined in the SPID format subroutine of FIG. 4 are correct, and the process transitions to step 310—the first step in a test call sequence, to be described. However, if the attempt to bring up the line using the derived SPID(s) is unsuccessful, the process transitions to a sequence of operations, to be described, to determine the reason for the failure.

More particularly, during the initial attempt to select and register the proper National ISDN SPID format, the routine checks for characteristic behavior of AT&T switches, namely, the receipt of any Management Information Message (MIM), or receipt of a call set-up message containing an invalid reference number, as shown in query step 305. Since such responses are unique to AT&T switches, if the answer to query step 305 is YES, it is inferred that the switch is an AT&T switch and the process transitions to step 306. In step 306, the routine selects AT&T custom protocol and resets the SPID format index to zero. It then transitions to a SPID table exhaustive search subroutine to be described, that begins with query step 307. On the other hand, if no such 'AT&T' responses have been received, it is inferred that the switch is not an AT&T switch and the process transitions to query step 307 without changing the initially selected National ISDN SPID format index.

In query step 307, the currently accessed table of SPID format indices is stepped or advanced, one index entry at a time, to the next SPID index and, at each iteration, an inquiry is made as to whether the end of the table has been reached—namely, have all of the table SPID format entries been tried? If the answer to query step 307 is YES, indicating none of the entries has produced the required SPID, a failure to generate a SPID is inferred and the routine is terminated. However, if the answer to query step 307 is NO—indicating that additional SPID format table entries remain—the routine transitions to step 308, wherein respective prefix and suffix codes are derived using the next index entry in the table, and either one or two SPIDs are generated, as determined by the number of LDNs entered by the user, in accordance with the subroutine of FIG. 4.

With one or two new SPIDs generated from the next table entry, the routine advances to step 309, and attempts to bring up the line (register the generated SPID(s)). If the attempt to bring up the line is successful, it is inferred that the derived SPID and its associated switch protocol as determined in the subroutine of FIG. 4 are correct, and the process transitions to step 310. However, if the attempt to bring up the line using the derived SPID(s) is unsuccessful, the process loops back to the table entry search subroutine at step 307. Eventually, either the last entry in the SPID format table will be processed without bringing up the line, resulting in step 307 producing a failure, or the line will be successfully brought up in step 309, and the process will transition to test call attempt step 310.

Figure 5:
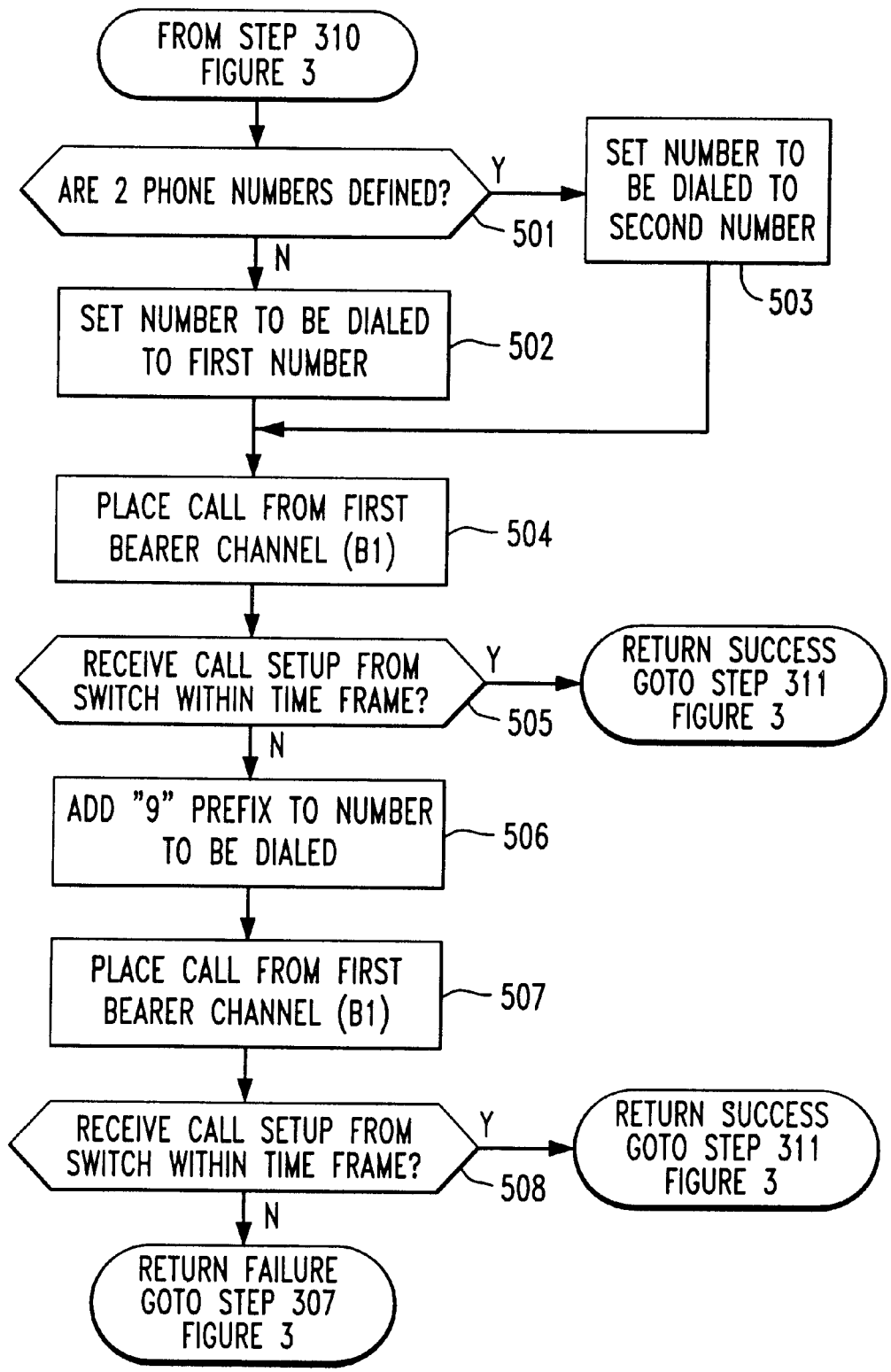
FIG. 5 shows the respective steps of a test call subroutine employed within the link pre-establishment control mechanism of FIG. 3.

Once the line has been successfully brought up, via one of steps 304 and 309, and the routine transitions to test call attempt step 310, as described above, the SPID/switch detect mechanism branches into the test call subroutine shown in FIG. 5. In the first (query) step 501 of the test call attempt subroutine, the number of phone numbers entered by the user is determined. If only one LDN has been entered (the answer to query step 501 is NO), the subroutine transitions to step 502, which sets the number to be dialed in the test call as that one number entered by the user. The subroutine then transitions to step 504. On the other hand if two phone numbers have been entered (the answer to query step 501 is YES), the subroutine transitions to step 503, which uses the first entered number as the 'calling' number and sets the 'to be dialed' or 'called' number in the test call as the second number entered by the user. The call attempt subroutine then transitions to step 504.

In step 504, the terminal equipment places a test call to the number selected in the appropriate one of steps 502 and 503. (To help distinguish between National ISDN and DMS-100 switch protocols, the test call contains a low layer compatibility information element, which is specified under National ISDN, but not under DMS custom. As will be described, the routine monitors test call progress for receipt of a prescribed status message associated with the behavior of DMS Custom switch protocol.)

Next, in step 505, the subroutine looks to see whether it has received a failure indication from the switch or whether the placed call has not been received from the switch within a prescribed period of time (e.g., within 30 seconds, as a non-limiting example). If the answer to query step 505 is YES (a call has been successfully placed), it is inferred that the determined SPID/switch protocol is correct, and the subroutine exits to step 311 of the routine of FIG. 3. However, if the answer to query step 505 is NO (the attempt to place a test call has not been successful), the test call subroutine transitions to step 506, which augments the called number by adding a prefix "9" to the LDN, and the call is redialed in step 507.

In step 508, the subroutine looks to see whether it has received a failure indication from the switch or whether the placed call has not been received within the prescribed period of time. If the answer to query step 508 is YES (the redialed call has been successful), it is inferred that the determined SPID/switch protocol is correct, and the subroutine exits to step 311 of the routine of FIG. 3. However, if the answer to query step 508 is NO (the redialed call has not been successful), the test call fails and the process exits to step 307 described previously.

If the test call (or redialed test call) has been successfully placed in either of steps 505 or 508, with the call attempt subroutine having branched to query step 311 in the main routine of FIG. 3, a determination is made as to whether the selected protocol is that of an AT&T custom switch. If the answer to step 311 is YES, the process is terminated at 'ready to place a call' step 320. The switch has been identified as an AT&T switch and the terminal equipment is now ready to place a call.

If the answer to step 311 is NO, the process transitions to query step 312, which inquires whether the test call returned a status message containing the Cause IE equal to 43 (ACCESS INFO DISCARDED), which is characteristic of DMS custom switch protocol. As pointed out above, the test call contains a low layer compatibility information element, specified under National ISDN, but not under DMS custom, so that the test call progress can be monitored for a prescribed status message associated with the behavior of DMS Custom switch protocol. If the iterative SPID search has advanced beyond the last National ISDN entry, DMS behavior is inferred. If DMS behavior is not detected, it is concluded that the SPID is associated with National ISDN switch protocol.

Thus, if the answer to query step 312 is YES, DMS custom protocol is selected in step 313, and the process is successfully terminated at 'ready to place a call' step 320. However, if the answer to query step 312 is NO, it is inferred that the SPID is associated with National ISDN switch protocol, and the routine is successfully terminated at step 320.

From the foregoing description, it will be appreciated that the present invention effectively circumvents the inability of an ISDN user to properly configure an installed ISDN terminal equipment, even when provided with correctly assigned switch protocol, SPID and LDN parameters by the telephone service provider. When the link pre-establishment control routine of FIGS. 3–5 is invoked, the SPID/switch protocol detector routine proceeds to conduct the SPID search and registration sequence, followed by a call attempt subroutine, as described above. If successful, it will have identified both the SPID and its associated switch protocol, that will enable the terminal equipment to place a call.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method for enabling a digital communications device to place a call using a service profile identifier (SPID), comprising the steps of:

(a) coupling said digital communications device with an automated SPID registration routine which, when executed, is operative to attempt registration of said SPID with communications equipment through which said digital communications device may place said call, said automated SPID registration routine including the steps of:

(a1) generating a SPID in accordance with a directory number and a SPID format, and (a2) attempting to register the SPID generated in step (a1);

(b) executing the automated SPID registration routine of step (a); and (c) in response to successful registration of the SPID generated in step (a), configuring said digital communications device for the placement of said call by way of said communications equipment, using the SPID that has been successfully registered.

2. A method according to claim 1, wherein step (c) further includes, in response to said successful registration of the SPID generated in step (a), placing a test call via said communications equipment to said directory number and, in response to successful placement of said test call, configuring said digital communications device for the placement of calls using the SPID that has been successfully registered.

3. A method according to claim 1, wherein step (a2) further includes, in response to failing to register the SPID generated in step (a1), repeating step (a1) in accordance with said directory number and another SPID format, so as to generate a new SPID, and then repeating step (a2), so as to attempt to register said new SPID.

4. A method according to claim 1, wherein:

step (a1) comprises iteratively generating successive SPIDs in accordance with said directory number and respectively different SPID formats, and step (a2) comprises, for each successive SPID iteratively generated in step (a1), attempting to register said successive SPID, and wherein step (c) comprises, in response to successful registration of said successive SPID, configuring said digital communications device for the placement of calls using said successive SPID that has been successfully registered.

5. A method according to claim 4, wherein said respectively different SPID formats are associated with different communication switch protocols.

6. A method according to claim 1, wherein said SPID format is associated with DMS-100 protocol.

7. A method according to claim 1, wherein said SPID format is associated with National ISDN protocol.

8. A method according to claim 1, wherein said SPID format is associated with AT&T custom protocol.

9. A method according to claim 1, wherein step (a1) comprises iteratively stepping through SPID formats of at least one table of respectively different SPID formats.

10. An arrangement for enabling a digital communications device to conduct digital communications via a communications network to a destination site, including ISDN terminal equipment which is configured to interface said digital communications device to a central office switch, said ISDN terminal equipment having an interface through which directory number information is supplied, and a communications controller, which is operative to control communications carried out by said ISDN terminal equipment, by generating a service profile identifier for conducting digital communications via said central office switch, in accordance with a service profile identifier detection routine, that automatically performs the steps of:

(a) generating a SPID in accordance with a directory number and a SPID format;

(b) attempting to register the SPID generated in step (a); and (c) in response to step (b) successfully registering the SPID generated in step (a), configuring said ISDN terminal equipment the placement of said call, using the SPID that has been successfully registered, but otherwise repeating steps (a) and (b), using a different SPID generated in accordance with said directory number and another SPID format, and, in response to a repeated step (b) successfully registering the SPID generated in a repeated step (a), configuring said ISDN terminal equipment for the placement of said call, using the SPID that has been successfully registered.

11. An arrangement according to claim 10, wherein step (a) includes using a SPID format contained in a table of SPID formats associated with different switch protocols.

12. An arrangement according to claim 10, wherein said SPID format is associated with AT&T Custom protocol.

13. An arrangement according to claim 10, wherein said SPID format is associated with National ISDN protocol.

14. An arrangement according to claim 10, wherein said SPID format is associated with DMS-100 protocol.

15. An arrangement according to claim 11, wherein said different SPID formats are associated with DMS-100 protocol.

16. An arrangement according to claim 11, wherein said different SPID formats are associated with National ISDN protocol.

17. A method of automatically providing an ISDN communication device with a service profile identifier (SPID) employable by said ISDN communication device to conduct ISDN communications over a communication path with an ISDN switch, said method comprising the steps of:

causing said ISDN communication device to apply at least one prescribed electrical stimulus to said communication path; and automatically selecting one of a plurality of different SPIDs based upon the application of said at least one prescribed electrical stimulus by said ISDN communication device to said communication path.

18. A method according to claim 17, further including the step of storing, in a digital database, data representative of said plurality of different SPIDs associated with different types of ISDN switches, and said selecting step comprises selecting said one of said plurality of different SPIDs based upon said data stored in said digital database.

19. A method according to claim 17, further including the step of storing, in a digital data base of said ISDN communication device, data representative of said plurality of different SPIDs associated with different types of ISDN switches, and said selecting step comprises selecting said one of said plurality of different SPIDs based upon said data stored in said digital database.

20. A method according to claim 17, wherein said causing step comprises causing said ISDN communication device to apply a first electrical stimulus associated with a first potential SPID to said communication path, and said selecting step comprises selecting said first potential SPID based upon a first response to the application of said first electrical stimulus to said communication path, but selecting another SPID based upon a second response to the application of said first electrical stimulus to said communication path.

21. A method according to claim 17, wherein said causing step comprises causing said ISDN communication device to apply a plurality of electrical stimuli associated with respectively different SPIDs to said communication path, and said selecting step comprises selecting said one of said plurality of different SPIDs based upon a prescribed response to one of said plurality of electrical stimuli.

22. A method of automatically providing an ISDN communication device with a service profile identifier (SPID) employable by said ISDN communication device to conduct ISDN communications over a communication path with an ISDN switch, said method comprising the steps of:

storing a plurality of different SPIDs associated with different types of ISDN switches;

causing said ISDN communication device to apply an electrical stimulus to said communication path; and automatically selecting one of said plurality of different SPIDs based upon said electrical stimulus applied by said ISDN communication device to said communication path.

23. A method according to claim 22, wherein said causing step comprises causing said ISDN communication device to apply a plurality of electrical stimuli associated with respectively different SPIDs to said communication path, and said selecting step comprises selecting said one of said plurality of different SPIDs based upon a prescribed response to one of said plurality of electrical stimuli.

* * * * *